US006346328B1

(12) United States Patent
Parsonage et al.

(10) Patent No.: US 6,346,328 B1
(45) Date of Patent: Feb. 12, 2002

(54) COMPOSITE ARTICLES INCLUDING A FLUOROPOLYMER

(75) Inventors: Edward E. Parsonage, St. Paul; Attila A. Molnar, Vadnais Heights; Thomas J. Blong, Woodbury; Robert E. Kolb, Afton, all of MN (US)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/329,686

(22) Filed: Jun. 10, 1999

Related U.S. Application Data

(60) Provisional application No. 60/094,668, filed on Jul. 30, 1998.

(51) Int. Cl.$^7$ .................. B32B 25/08; B32B 27/08; B32B 27/30; B32B 27/34; B32B 27/36

(52) U.S. Cl. .................. 428/412; 428/421; 428/422; 428/424.2; 428/424.4; 428/424.6; 428/474.7; 428/474.9; 428/475.8; 428/476.1; 428/476.3; 428/483; 428/515; 428/516; 428/520; 428/522; 428/523

(58) Field of Search .................. 138/124, 125, 138/126, 137, 140, 145, 146, DIG. 3; 428/421, 412, 422, 474.9, 475.5, 475.8, 476.3, 483, 424.2, 424.4, 424.6, 575, 520, 522, 424.7, 516, 523

(56) References Cited

U.S. PATENT DOCUMENTS

| | | | |
|---|---|---|---|
| 3,655,727 A | 4/1972 | Patel et al. | 260/470 P |
| 3,686,143 A | 8/1972 | Bowman | 260/47 UP |
| 3,712,877 A | 1/1973 | Patel et al. | 260/87.7 |
| 3,857,807 A | 12/1974 | Kometani et al. | 260/29.6 F |
| 3,876,654 A | 4/1975 | Pattison | 260/30.4 R |
| 3,933,732 A | 1/1976 | Schmiegel | 260/42.27 |
| 4,233,421 A | 11/1980 | Worm | 525/343 |
| 4,259,463 A | 3/1981 | Moggi et al. | 525/331 |
| 4,335,238 A | 6/1982 | Moore et al. | 526/254 |
| 4,501,858 A | 2/1985 | Moggi | 525/340 |
| 4,673,715 A | 6/1987 | Caywood | 525/340 |
| 4,748,208 A | 5/1988 | Kasahara et al. | 525/151 |
| 4,833,212 A | 5/1989 | Yamada et al. | 525/359.2 |
| 4,882,390 A | 11/1989 | Grootaert et al. | 525/326.3 |
| 4,933,090 A | 6/1990 | Gill et al. | 210/700 |
| 5,319,025 A | 6/1994 | Weigelt | |
| 5,383,087 A | 1/1995 | Noone et al. | |
| 5,399,434 A | 3/1995 | Katz et al. | 428/421 |
| 5,552,199 A | 9/1996 | Blong et al. | 428/36.9 |
| 5,566,720 A | 10/1996 | Cheney et al. | |
| 5,658,670 A | 8/1997 | Fukushi et al. | 428/421 |
| 5,792,532 A | 8/1998 | Pfleger | |
| 5,804,670 A | 9/1998 | Stoeppelmann | |
| 6,096,428 A | 8/2000 | Jing et al. | 428/421 |
| 6,156,400 A | 12/2000 | Jing et al. | 428/35.7 |

FOREIGN PATENT DOCUMENTS

| | | |
|---|---|---|
| EP | 0 739 712 A2 | 10/1996 |
| WO | WO 93/01493 | 1/1993 |
| WO | WO 93/14933 | 8/1993 |
| WO | WO 99/00249 | 1/1999 |
| WO | WO 99/32557 | 7/1999 |

OTHER PUBLICATIONS

F. W. Billmeyer, *Textbook of Polymer Science*, 3$^{rd}$ ed., pp. 398–403, John Wiley & Sons, New York (1984).
R. A. Brullo, "Fluoroelastomer Rubber for Automotive Applications", *Automotive Elastomer & Design*, Jun. 1985.
R. A. Brullo, "Fluoroelastomer Seal Up Automotive Future", *Materials Engineering*, Oct., 1988.
W. M. Grootaert et al., "Fluorocarbon Elastomers", Kirk–Othmer, *Encyclopedia of Chemical Technology*, vol. 8, pp. 990–1005 (4$^{th}$ ed., John Wiley & Sons, 1993).
"Organic Fluorine Compounds", Kirk–Othmer, *Encyclopedia of Chemical Technology*, vol. 11, pp. 20, 21, 32, 33, 40, 41, 50, 52, 62, 70, 71 (John Wiley & Sons, 1980).
West, A.C. & Holcomb, A.G. "Fluorinated Elastomers", Kirk–Othmer, *Encyclopedia of Chemical Technology*, vol. 8, 3$^{rd}$ ed., John Wiley & Sons, Inc., pp. 500–515 (1979).

*Primary Examiner*—Vivian Chen
(74) *Attorney, Agent, or Firm*—James V. Lilly; Dean M. Harts

(57) ABSTRACT

A composite article is provided which includes a fluoropolymer intimately bonded to a component including a substantially non-fluorinated thermoplastic having pendant phenolic groups in combination with a base. Increased adhesion is observed by a greater peel strength value between the fluoropolymer component and a non-fluorinated thermoplastic having pendant phenolic groups.

48 Claims, No Drawings

COMPOSITE ARTICLES INCLUDING A FLUOROPOLYMER

This application claims the benefit of priority from U.S. Provisional Application No. 60/094,668, filed Jul. 30, 1998.

BACKGROUND OF THE INVENTION

Fluoropolymers, or fluorine-containing polymers, are a commercially important class of materials. Fluoropolymers include, for example, uncrosslinked and crosslinked fluorocarbon elastomers and semi-crystalline or glassy fluorocarbon plastics. Fluorocarbon plastics (or fluoroplastics) are generally of high thermal stability and are particularly useful at high temperatures. They also exhibit extreme toughness and flexibility at very low temperatures. Many of these fluoroplastics are almost totally insoluble in a wide variety of solvents and, thus, are generally chemically resistant. Some have extremely low dielectric loss and high dielectric strength, and many have unique nonadhesive and low-friction properties. See, for example, F. W. Billmeyer, *Textbook of Polymer Science*, $3^{rd}$ ed., pp. 398–403, John Wiley & Sons, New York (1984).

Fluorocarbon elastomers, particularly the copolymers of vinylidene fluoride with other ethylenically unsaturated halogenated monomers, such as hexafluoropropylene, have particular utility in high temperature applications, such as seals, gaskets, and linings. See, for example, R. A. Brullo, "Fluoroelastomer Rubber for Automotive Applications," *Automotive Elastomer & Design*, June 1985, "Fluoroelastomer Seal Up Automotive Future," *Materials Engineering*, October 1988, and W. M. Grootaert, et al., "Fluorocarbon Elastomers," Kirk-Othmer, *Encyclopedia of Chemical Technology*, Vol. 8, pp. 990–1005 ($4^{th}$ ed., John Wiley & Sons, 1993).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire coatings, electrical components, seals, solid and lined pipes, and piezoelectric detectors. See, for example, "Organic Fluorine Compounds," Kirk-Othmer, *Encyclopedia of Chemical Technology*, Vol. 11, pp., 20, 21, 32, 33, 40, 41, 50, 52, 62, 70, 71 (John Wiley & Sons, 1980).

In the automotive industry, for example, increased concern with evaporative fuel standards has led to the need for fuel system components that have improved barrier properties. This helps reduce the permeation of fuel vapors through automotive elements such as fuel filler lines, fuel supply lines, fuel tanks, and other elements of an automobile fuel system. Multi-layer tubing and other articles containing a fluorinated layer have been used in such automotive elements to provide a chemically resistant vapor barrier. Multi-layer articles are also useful in a number of other industries including, for example, the chemical processing and/or handling industries, and the electrical and electronics industries. Such multi-layer articles can include one or more other layers that can add strength, rigidity, or other mechanical properties.

Multi-layer compositions comprising a fluorinated polymer layer and a polyamide or polyolefin layer are known. See, for example, U.S. Pat. No. 4,933,090 (Krevor) which discloses laminate tubular articles that can include layers of fluorocarbon elastomers, and International Publication No. WO 93/14933 (LaCourt) which discloses a laminar film structure that includes a polyimide and a fluoropolymer.

To be useful, these multi-layer articles should not delaminate during use. That is, the bond strength between the layers of the multi-layer article should be sufficient to prevent the layers from separating. A variety of methods have been employed to increase the bond strength between a layer comprising a fluoropolymer and a layer comprising a substantially non-fluorinated polymer. For example, a layer of adhesive can be added between the two layers. However, the adhesive used must not limit the performance of the multi-layer article.

As an alternative to, or in addition to, adhesives, surface treatment of one or both of the layers has been used to increase the adhesive bond strength between the layers. For example, layers comprising a fluoropolymer have been treated with a charged gaseous atmosphere followed by application of a layer of thermoplastic polyamide.

In another approach, the adhesion between a substantially non-fluorinated polymer and a fluoropolymer, wherein the fluoropolymer is derived from vinylidene fluoride (VDF), and optionally hexafluoropropylene (HFP), has been found to increase upon exposure of the fluoropolymer to a primary or secondary amine compound. An example includes providing a layer comprising a fluoropolymer comprising interpolymerized units derived from vinylidene fluoride, a layer of a melt-processable, substantially non-fluorinated polymer, and a melt-processable aliphatic di- or polyamine of less than 1,000 molecular weight. See, for example, U.S. Pat. No. 5,658,670.

There are however certain circumstances where the production of such amine containing compounds or their subsequent use is problematic. What is needed is an alternative method for improving the adhesion between fluoropolymers and substantially non-fluorinated materials. This invention provides such a method.

SUMMARY OF THE INVENTION

In one aspect, the present invention provides a method of adhering or bonding a substantially non-fluorinated thermoplastic polymer to a fluoropolymer. In another aspect, the present invention provides a composite article comprising a substantially non-fluorinated thermoplastic polymer adhered to a fluoropolymer. In still another aspect, the present invention provides a multilayer article comprising a fluoropolymer adhered to a first surface of the substantially non-fluorinated thermoplastic polymer and a second polymer adhered to a second surface of the substantially non-fluorinated thermoplastic polymer. When the thermoplastic polymer layer comprises a functionalized polyolefin, (i.e., a polyolefin derived from the reaction of a functionalized olefin with a bisphenol), there is substantially no organoonium present.

The method of the invention comprises the steps of (a) providing (i) a substantially non-fluorinated thermoplastic polymer having one or more pendant phenolic groups, and optionally one or more primary or secondary pendant amine groups thereon, (ii) a base, and (iii) a fluoropolymer, (b) at least partially reacting the phenolic group or groups with the base, to form a modified substantially non-fluorinated thermoplastic polymer, (c) forming a composite article comprising the fluoropolymer in contact with a first surface of the modified thermoplastic polymer, and (d) subjecting the composite article to pressure and/or temperature conditions adequate to bond the modified thermoplastic polymer to the fluoropolymer. When the thermoplastic polymer of step "a" is an olefin derived from the reaction of a functionalized olefin with a bisphenol, there is substantially no organo-onium present during the process.

The composite article of the invention comprises a fluoropolymer layer bonded to a layer of the modified thermoplastic polymer. The composite article may further have a second substantially non-fluorinated thermoplastic polymer bonded to the modified thermoplastic polymer. The second thermoplastic polymer may be the same as, or different than, the modified thermoplastic polymer.

The embodiments of the invention are useful in providing a wide variety of shaped composite articles such as sheets and films, containers, hoses, tubes and the like. The articles so provided are especially useful wherever chemical resistance and/or barrier properties are necessary. Examples of specific uses for the composite structures of the invention include their use in rigid and flexible retroreflective sheets, adhesive articles such as adhesive tapes, paint replacement films, drag reduction films, fuel line and filler neck hoses, hydraulic fluid hoses, exhaust handling hoses, fuel tanks, and the like. The composite articles of the invention are also useful in chemical handling and processing applications, and as wire and cable coatings or jackets.

As used herein, a thermoplastic polymer, whether fluorinated or substantially non-fluorinated, means a polymer that is melt processable and has either (i) a glass transition temperature above ambient temperature (i.e., above 17° C.) or (ii) a melt point and is semi-crystalline.

DESCRIPTION OF PREFERRED EMBODIMENTS

The fluoropolymers useful (also known as fluorinated polymers) include both vinylidene fluoride containing fluoropolymers and substantially non-vinylidene fluoride containing fluoropolymers and mixtures thereof. Additionally, the fluoropolymers used in the invention include both fluoroplastics (also known as fluorothermoplastics) and fluoroelastomers. Blends of various fluoropolymers may be employed in the invention if desired.

Fluoroplastics are distinguished from fluoroelastomers or fluororubbers by their properties. Fluoroplastic materials are melt-processable and have either a melt point and are semi-crystalline, or have a glass transition temperature above ambient temperature. In contrast, fluoroelastomers or fluororubbers are generally amorphous and usually do not exhibit a melt point. While some fluoroelastomers may be melt-processable, a curing step is typically used in making finished articles of fluoroelastomers. The curing step generally results in a material with substantially reduced melt-processability. The terms fluoroelastomer and fluororubber are generally used interchangeably. See, for example, American Society for Testing and Materials (ASTM) D 1566 for elastomer and rubber definitions.

Vinylidene Fluoride Containing Fluoropolymers

As used herein the term "vinyridene fluoride containing fluoropolymers" includes fluoropolymers derived from vinylidene fluoride ("VF2" or "VDF") and fluoropolymers derived from other monomers which, when polymerized, form monomer sequences similar to polymerized vinylidene fluoride. Such monomers include ethylenically unsaturated monomers which, when incorporated into fluoropolymers, can produce a similar (including an identical) polymeric microstructure as the polymerized VDF. In general, the microstructure of a carbon bonded hydrogen atom between carbon bonded fluorine atoms creates a microstructure similar to polymerized VDF. The reactivity of a carbon bonded hydrogen is further enhanced when its carbon atom is adjacent to, or attached to a carbon atom possessing a carbon bonded —CF3 group (supplied by HFP or 2-hydropentafluoropropylene for instance) or another electron withdrawing group. Monomers suitable for forming such carbon-bonded-hydrogen reactive sites include, but are not limited to, VDF, 1-hydropentafluoropropene, 2-hydropentafluoropropene, and trifluoroethylene.

Preferably, these VDF-containing fluoropolymers are easily prone to dehydrofluorination and are also prone to a subsequent adhesion promoting reaction. The carbon-bonded-hydrogen sites produced upon copolymerization of these monomers, including VDF, can be pre-dehydrofluorinated to form double bonds within the backbone of the fluoropolymer. While not wishing to be bound by any particular theory, it is believed that preformation of these double bonds may accelerate the adhesion promoting reaction. This dehydrofluorination reaction may also be produced in situ, e.g., during processing. This in situ dehydrofluorination reaction may be aided by the use of an appropriate catalyst, preferably of the type discussed below. Such VDF-containing fluoropolymers comprise at least 3% by weight of interpolymerized units derived from VDF or other monomers with similar microstructure when polymerized. These VDF-containing fluoropolymers may be homopolymers or copolymers with other ethylenically unsaturated monomers. More preferably, the VDF-containing fluoropolymer is formed from (i) a fluorine-containing monomer selected from the group of trifluoroethylene, 1-hydropentafluoropropylene, 2-hydropentafluoropropylene, mixtures thereof, and optionally (ii) at least one monomer copolymerizable therewith. In one preferred embodiment, the VDF-containing fluoropolymer comprises a hexafluoropropylene-vinylidene fluoride polymer.

Such VDF-containing fluoropolymers (homopolymers, copolymers, terpolymers, etc.) can be made by well-known conventional means, for example by, free-radical polymerization of VDF with or without other ethylenically unsaturated monomers. The preparation of colloidal, aqueous dispersions of such polymers and copolymers is described, for example, in U.S. Pat. No. 4,335,238 (Moore et al.). Customary processes for making such fluoropolymers can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

The VDF-containing fluoropolymers useful in this invention can optionally include other useful fluorine-containing monomers such as hexafluoropropene (HFP), tetrafluoroethylene (TFE), chlorotrifluoroethylene (CTFE), 2-chloropentafluoro-propene, a fluorinated vinyl ether, including a perfluoroalkyl vinyl ether such as $CF_3OCF=CF_2$ or $CF_3$ $CF_2$ $CF_2OCF=CF_2$. Certain fluorine-containing di-olefins are also useful, such as, perfluorodiallylether and perfluoro-1,3-butadiene.

The VDF-containing fluoropolymers useful in this invention may also comprise interpolymerized units derived from fluorine-free, unsaturated olefin comonomers, e.g., ethylene, propylene or butadiene. Preferably, at least 50% by weight of all monomers in a polymerizable mixture are fluorine-containing. The VDF-containing fluorine-containing monomer may also be copolymerized with iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available VDF-containing fluoropolymer materials include, for example, THV 200, THV 400, THV 500G fluoropolymer (available from Dyneon LLC, St. Paul, Minn.), KYNAR 740 fluoropolymer (available from Atochem North America, Philadelphia, Pa.), HYLAR 700 (available from Ausimont USA, Inc., Morristown, N.J.), and FLUOREL FC-2178 (available from Dyneon LLC).

Substantially Non-vinylidene Fluoride Containing Fluoropolymers

These fluoropolymers typically do not contain VDF monomer (or any other similar monomer) at a level such that, when polymerized, produces a microstructure which is similar to polymerized VDF. Hence, these fluoropolymers are referred to herein as "substantially non-vinylidene fluoride (non-VDF) containing fluoropolymers." By "substantially non-VDF containing," it is meant that the fluoropolymer preferably is substantially free from interpolymerized units derived from VDF monomer, or other monomers which provide a microstructure similar to that described above. These fluoropolymers comprise less than 3%, preferably less than 1% by weight of interpolymerized units derived from VDF or other monomers which produce a microstructure similar to that described above.

An example of a useful non-VF2 fluoropolymer comprises a terpolymer of ethylene, hexafluoropropylene and tetrafluoroethylene. Such terpolymers preferably have a melting point of less than 168° C. A preferred terpolymer of these three monomers has an ethylene content of at least 11% and a hexafluoropropylene content of at least 22%.

Examples of non-VF2 containing fluoropolymers include Dyneon ETFE 6235, Dyneon E-14659 and E-14660, Dyneon PFA 6502N and 6515N, Dyneon FEP 6101 and 6107, Hostaflon PTFE TF1620 and Hostaflon TFM1600 and Aflas FA-100S and FA-150P (all available from Dyneon LLC). Other examples include Halar ECTFE 300 and 500 (available from Ausimont USA Inc., Morristown, N.J.).

In the case of many of these non-VF2 containing fluoropolymers, it may be necessary to treat the surface, or bulk, of the fluoropolymer to enhance or promote the adhesion with the phenolic-containing component. Treatment may be accomplished with any of several methods known in the industry, such as: contact with a solution of elemental sodium, corona treatment from an electrical discharge in air or another atmosphere, or by flame treatment. These treatments are believed to induce double bonds or other chemical functionality along the backbone or surface of the fluoropolymer thereby allowing a site for adhesion with the phenolic containing component. The above mentioned treatments can also be applied to VF2 containing class of polymers.

Blends of fluoropolymers from the VF2 and non-VF2 containing classes may also be employed in the invention.

Substantially Non-Fluorinated Polymers

Useful substantially non-fluorinated materials can include any of a number of well known, substantially non-fluorinated polymers. As used herein the term "substantially non-fluorinated" refers to polymers and polymeric materials having fewer than 10 mole percent of carbon-bonded fluorine atoms. Preferably, the substantially non-fluorinated polymer has fewer than 2 mole percent of carbon-bonded fluorine atoms, and more preferably fewer than 1 mole percent of carbon-bonded fluorine atoms. A particularly useful subclass of substantially non-fluorinated fluoropolymers are those that have one or more pendant primary or secondary amine groups.

Examples of classes of substantially non-fluorinated polymers useful in the invention include thermoplastic polymers such as polyamides, polyimides, polyurethanes, polyolefins, polystyrenes, polyesters, polycarbonates, polyketones, polyureas, polyacrylates and polymethacrylates. The particular substantially non-fluorinated polymer selected will depend upon the application or desired properties, such as chemical and/or flame resistance, of the composite article according to the invention.

Polyamides useful as the substantially non-fluorinated polymer are generally commercially available. For example, polyamides such as any of the well-known nylons are available from a number of sources. Particularly preferred polyamides are nylon-6, nylon-6,6, nylon-11, or nylon-12. It should be noted that the selection of a particular polyamide material should be based upon the physical requirements of the particular application for the resulting article. For example, nylon-6 and nylon-6,6 offer higher heat resistant properties than nylon-11 or nylon-12, whereas nylon-11 and nylon-12 offer better chemical resistant properties. In addition to those polyamide materials, other nylon materials such as nylon-6,12, nylon-6,9, nylon-4, nylon-4,2, nylon-4, 6, nylon-7, and nylon-8 may also be used. Ring containing polyamides, e.g., nylon-6,T and nylon-6,1, may also be used. Polyether containing polyamides, such as PEBAX polyamides (Atochem North America, Philadelphia, Pa.), may also be used. Other useful polyamides include a zinc chloride resistant nylon-6 based material available as NYLTECH 7551 (Nyltech North America, Manchester, N.H.) and a polyamide having an excess of amine groups such as GRILAMID L20HV1 (EMS American Grilon, Sumter, S.C.).

Useful polyurethane polymers include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polyetramethylene ether glycol, polyethylene glycol, polycaprolactone diol, poly-1,2-butylene oxide glycol, and combinations thereof Chain extenders, such as butanediol or hexanediol, may also optionally be used in the reaction. Commercially available urethane polymers useful in the present invention include: PN-04 or 3429 from Morton International, Inc., Seabrook, N.H., and X-4107 from B.F. Goodrich Company, Cleveland, Ohio.

The polyolefin polymers useful as the substantially non-fluorinated polymer are generally homopolymers or copolymers of ethylene, propylene, acrylic monomers, or other ethylenically unsaturated monomers, for example, vinyl acetate and higher alpha-olefins. Such polymers and copolymers can be prepared by conventional free-radical polymerization or catalysis of such ethylenically unsaturated monomers. The degree of crystallinity of the hydrocarbon polymer or copolymer can vary. The polymer may, for example, be a semi-crystalline high density polyethylene or may be an elastomeric copolymer of ethylene and propylene. Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

Polyacrylates and polymethacrylates useful as the substantially non-fluorinated polymer include, for example, polymers of acrylic acid, methyl acrylate, ethyl acrylate, acrylamide, methylacrylic acid, methyl methacrylate, and ethyl acrylate, to name a few. As mentioned above, other useful substantially non-fluorinated polymers include polyesters, polycarbonates, polyketones, and polyureas. These materials are generally commercially available, for example, SELAR polyester (DuPont, Wilmington, Del.), LEXAN polycarbonate (General Electric, Pittsfield, Mass.), KADEL polyketone (Amoco, Chicago, Ill.), and SPECTRIM polyurea (Dow Chemical, Midland, Mich.).

Substantially non-fluorinated elastomeric materials useful in the current invention include acrylonitrile butadiene (NBR), butadiene rubber, chlorinated and chloro-sulfonated polyethylene, chloroprene, EPM, EPDM, epichlorihydrin (ECO), isobutylene isoprene, isoprene, polysulfide, polyurethane, silicone, PVC-NBR, styrene butadiene, and vinyl acetate ethylene. Examples of these compounds include Nipol 1052 NBR (Zeon, Lousville, Ky.), Hydrin 2000 ECO (Zeon, Louisville, Ky.), Hypalon 48 (Dupont, Wilmington Del.), and Nordel 2760P EPDM (Dupont, Wilmington Del.).

Substantially Non-Fluorinated Thermoplastic Polymer having Pendant Phenolic Groups Useful substantially non-fluorinated thermoplastics having at least one pendant phenolic group, include any of the substantially non-fluorinated thermoplastic polymers described above so long as a pendant phenolic group is present. As noted, these thermoplastic polymers may also have at least one pendant primary or secondary amine group, the pendant phenolic group may be a substituted or unsubstituted phenolic group. The polymer may contain both pendant substituted and unsubstituted phenolic groups. The phenolic group or groups may be incorporated into the substantially non-fluorinated polymer by copolymerization with a monomer containing a substituted or unsubstituted phenolic group. Alternatively, a phenolic containing compound may be mixed and reacted with a substantially non-fluorinated polymeric material. Similarly, the corresponding base may be added during or subsequent to the polymerization of the substantially non-fluorinated thermoplastic.

A particularly useful substituted phenolic salt compound is commercially available under the trade designation P-152, available from Mitsui Chemicals (Nashville, Tenn.). This material is said to be phenolic resin salts of 1,8diazabicyclo [5,4,0]undec-7-ene. For example, the P-152 may be mixed and reacted with a maleic anhydride functionalized polyolefin to produce the pendant phenoxide containing hydrocarbon polymer.

Other materials which may be modified with the addition of pendant phenoxide groups include polyamides, polyimides, polyurethanes, polystyrenes, polyesters, polycarbonates, polyketones, and polyureas. These materials are generally commercially available, for example, NYLTECH 755 polyamide from Nyltech North America (Manchester, N.H.), GRILAMID L20HV1 polyamide from EMS American Grilon (Sumter, S.C.), SELAR polyester from DuPont (Wilmington, Del.), LEXAN polycarbonate (General Electric, Pittsfield, Mass.), KADEL polyketone (Amoco, Chicago, Ill.), and SPECTRIM polyurea (Dow Chemical, Midland, Mich.).

The pendant phenolic groups may include either endgroups or pendant side chain groups of any polynuclear aromatic alcohol. These include pendant groups of unsubstituted and substituted phenolics, phenolic resins, resorcinols, hydroquinones, napthols, bis-phenols, and salts thereof, to name a few.

Bases

Bases can be inorganic or organic compounds. Organic bases include tertiary amines and amidine compounds, alkoxide salts, sodium stearate, magnesium oxalate, and benzotriazoate. Inorganic bases include magnesium oxide, lead oxide, calcium oxide, calcium hydroxide, sodium hydroxide, magnesium hydroxide, potassium hydroxide, lithium hydroxide, dibasic lead phosphite, zinc oxide, barium carbonate, strontium hydroxide, calcium carbonate, etc.

Representative classes of useful amine compounds include aliphatic, aryl and amidine amine compounds. Examples of these include 4-dimethyl amino pyridine, triisooctyl amine, 1,8-diazobicyclo(2,2,2)-octane, 1,5-diazobicyclo[4.3.0] non-5-ene, and 1,8-diazobicyclo[5.4.0] undec-7-ene, imidazole, benzotriazole, to name a few.

A useful class of amine compounds can be represented by the following formula:

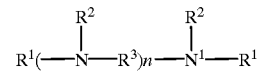

where:
R$^1$, R$^2$ are independently selected from hydrogen, substituted and unsubstituted alkyl, cycloalkyl, aryl, aralkyl, and alkaryl groups, and
R$^3$ is selected from substituted or unsubstituted alkylene, cycloalkylene, arylene, aralkylene, and alkarylene groups; n is a number from 0 to about 100. Preferably R$^1$ and R$^2$ are selected from substituted and unsubstituted alkyl, cycloalkyl, aryl, aralkyl and alkaryl groups.

Organo-Onium Compounds

Organo-onium compounds may be employed in the practice of some aspects of the invention. However, if the substantially non-fluorinated thermoplastic polymer having a pendant phenolic group is an olefin derived from the reaction of a functionalized polyolefin and a bisphenol, no organo-onium should be employed. However, when the thermoplastic polymer is not an olefin, organo-onium compounds may be used.

Organo-oniums are known, are described in the art and contain at least one heteroatom (i.e., a non-carbon atom such as N, P, S, O) bonded to organic or inorganic moieties. See, for example, U.S. Pat. No. 4,882,390 (Grootaert et al.); U.S. Pat. No. 3,655,727 (Patel et al.); U.S. Pat. No. 3,712,877 (Patel et al.); U.S. Pat. No. 3,857,807 (Kometani): U.S. Pat. No. 3,686,143 (Bowman); U.S. Pat. No. 3,933,732 (Schmiegel); U.S. Pat. No. 3,876,654 (Pattison); U.S. Pat.

No. 4,233,421 (Worm); U.S. Pat. No. 4,259,463 (Moggi et al.); U.S. Pat. No. 4,673,715 (Caywood): U.S. Pat. No. 4,833,212 (Yamada et al.); U.S. Pat. No. 4,748,208 (Kasahara et al.); U.S. Pat. No. 4,501,858 (Moggi); U.S. Pat. No. 4,882,390; and also see West, A. C. and Holcomb, A. G. "Fluorinated Elastomers", Kirk-Othmer; *Encyclopedia of Chemical Technology*, Vol. 8, 3$^{rd}$ Ed., John Wiley & Sons, Inc., pp. 500–515 (1979). Mixtures of organo-onium compounds are also useful in this invention.

Preferably, the organo-onium compounds include quaternary organo-onium compounds (such as those selected from the group consisting of ammonium, arsonium, phosphonium, stibonium, amino-phosphonium, phosphorane and immium compounds) and sulfonium compounds. Many of such compounds are described in U.S. Pat. No. 4,882,390 (Grootaert et al.).

Representative organo-onium compounds useful in this invention include: tetrabutylammonium chloride, tetrabutylammonium bromide, tetrahexylammonium chloride, tetraheptylammonium chloride, triphenylben-zylphosphonium chloride, tetrapentylammonium chloride, tributylallylphosphonium chloride, tributylbenzylphosphonium chloride, dibutyldipbenylphosphonium chloride, tetrabutylphosphonium chloride and tributyl(2-metboxy)propylphosphonium chloride, phenyltrimethylammonium chloride, tetrapropylammonium bromide, tetraheptylammonium bromide, tetramethylphosphonium chloride, tetramethylammonium chloride, tetraphenylphosphonium chloride, tetraphenylarsonium chloride, tetraphenylstibonium chloride, 8-benzyl-1,8-diazobicyclo[5.4.0]7-undecenium chloride, benzyltris (dimethylamino) phosphonium chloride, bis (benzyldiphenylphosphine) iminium chloride compounds and mixtures thereof Optional Additives The composite articles in accordance with the invention may also include optional additives, such as those typically used in other thermoplastic applications. The optional additives are preferably selected from the group of a pigment, a plasticizer, a tackifier, a filler, electrically conductive materials (such as those described in U.S. Pat. No. 5,552,199), electrically insulative materials, a stabilizer, an antioxidant, a lubricant, a processing aid, an impact modifier, a viscosity modifier, and mixtures thereof Composite Article Formation Methods known in the polymer art can be used to produce a composite article, such as a bonded multi-layer article, wherein the fluoropolymer component is in substantial, preferably intimate, contact with the substantially non-fluorinated thermoplastic material having pendant substituted and/or unsubstituted phenolic groups and base. For instance, the fluoropolymer component and the substantially non-fluorinated thermoplastic material and base can be formed by known methods into thin films or thicker sheets. These films or sheets can be laminated together under heat and/or pressure to form a bonded multi-layer article. Alternatively, the fluoropolymer component and the substantially non-fluorinated polymer having pendant substituted and/or unsubstituted phenolic groups and base can be simultaneously co-extruded into a multi-layer article.

In addition, all of these methods can be used to apply additional polymeric components or layers either before, during, or after the formation of the fluoropolymer component in contact with the component including the substantially non-fluorinated polymer having pendant phenolic groups.

Conditions by which two or more components are brought together (e.g., sequential extrusion, co-extrusion or lamination, to name a few) may be sufficient to provide adequate adhesion between the components. However, it may be desirable to further treat the resulting composite article with, for example, heat and/or pressure to improve adhesion. One way to supply additional heat, for example, is to slow the rate of cooling after extrusion of the components. Also, additional heat or energy can be added during or after extrusion or lamination processes, wherein the temperatures may be higher than that required for merely processing the components. Further, the complete composite article may be held at an elevated temperature and/or pressure for an extended period of time, such as in an oven, an autoclave, a heated liquid bath and the like. A combination of these methods can also be used.

The many advantages of a composite article in accordance with the invention are further illustrated by the following non-limiting examples in which all parts and percentages are given as parts and percentages by weight unless otherwise stated.

EXAMPLES

In the following Examples and Comparative Examples, various composites were prepared and the adhesion between the components, or layers, was evaluated.

Example 1

In Example 1, approximately 4 Kg of EMS L25W40NZ natural polyamide 12 (EMS American Grilon, Sumter, S.C.) and 80 g of P-152, a phenolic resin salt of 1,8 diazabicyclo [5,4,0]undec-7-ene (DBU) (Mitsui, Nashville, Tenn.) was first mixed together in a double 5 gallon pail tumble mixer for approximately 30 minutes. The resulting mixture was then added by an Accurate™ dry material feeder (Accurate Inc, Whitewater, Wis.) to a 25 mm corotating Behrstorff twin screw extruder (Behrstorff, Charlotte, N.C.) operating at a screw speed of 250 rpm and die temperature of 220 C. The extruded strand was cooled in a water bath and pelletized at a rate of 9.8 Kg/hr. A sample of the resulting pellets were then pressed between sheets of 3 mil thick perfluorinated ethylene-propylene (FEP) film using a Wabash Hydraulic Press Co. heated platen press at 250 C and 68.9 MPa (10000 psi) to a final thickness of 0.025 cm.

A composite was made with 2.54 cm by 5.08 cm (1 in by 2 in) samples of the extruder-blended adhesive film and a 2.54 cm by 7.62 cm (1 in by 3 in) 0.076 cm (0.030 in) thick sheet of THV 500, a terpolymer of tetrafluoroethylene, hexafluoropropylene and vinylidene fluoride, available from Dyneon LLC (Oakdale, Minn.). A sheet of 2.5 cm×7.6 cm (1 in by 3 in) 30 mil thick EMS L25W40NZ polyamide 12 available (EMS American Grilon, Sumter S.C.) was then placed adjacent to the extruder mixed adhesive film giving a final structure of a layer of polyamide-12, a layer of adhesive film, and finally the layer of THV 500.

The adhesion between the layers was tested using ASTM D-1876, commonly known as a "T-peel" test. To facilitate testing via the T-peel test, a sheet of 0.00762 cm (3 mil) perfluorinated ethylene-propylene (FEP) film was placed between the THV and polyamide-12 layers. The FEP film was inserted about 1.25 cm (0.5 in) only along the shorter edge of the 2.54 cm by 7.62 cm (1 in by 3 in) sample. The FEP film did not adhere to either of the layers and was used only to create a THV "tab" and a polyamide-12 "tab" to insert into the jaws of the test device.

Three identical composites were simultaneously heated under pressure using a Wabash Hydraulic Press Co. heated platen press at 250° C. and 689 kPa (100 psi) for 3 minutes.

The samples were removed for the press and allowed to cool to room temperature. Peel strength or adhesion was measured on the samples in accordance with ASTM D 1876 (T-Peel test). An Instron™ Model 1125 tester, available from Instron Corp., set at a 100 min/min crosshead speed was used as the test device. The peel strength was calculated as the average load measured during the peel test. The measured peel strength from Example 1 is reported in Table 1.

Comparative Example C1

In Comparative Example C1 a composite sample was prepared and tested as in Example 1, except that no extruder mixed adhesive film was used between the polyamide-12 and THV 500 film. The test results for Comparative Example C1 are reported in Table 1.

Example 2

In Example 2, a sample was prepared and tested as in Example 1, except that the THV 500 was replaced by E-14660 from Dyneon LLC. This material is a terpolymer of tetrafluoroethylene, hexafluoropropylene and ethylene. Test results for Example 2 are reported in Table 1.

Comparative Example C2

In Comparative Example C2, a sample was prepared and tested as in Example 2, except that no extruder mixed adhesive film was used between the polyamide-12 and E-14660 layers. Test results for Comparative Example 2 are reported in Table 1.

| Example # | Composite Construction | Peel (Kg./2.54 cm) | Failure Interface |
|---|---|---|---|
| 1 | 1: Polyamide-12<br>2: Tie Layer<br>3: THV 500 | 11.4 | THV Cohesive Failure |
| C1 | 1: Polyamide-12<br>2: THV 500 | 0.4 | Interfacial Failure |
| 2 | 1: Polyamide-12<br>2: Tie Layer<br>3: E-14660 | 14.5 | HTE 1500 Cohesive Failure |
| C2 | 1: Polyamide-12<br>2: E-14660 | 7.7 | Interfacial Failure |

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

Example 3

In Example 3, a mixture containing 49.5% Grilamid™ L25W40X black polyamide 12 (EMS American Grilon, Sumter S.C.), 49.5% Grilamid™ L20HV1, said to be a polyamide 12 having an excess of primary amine end groups (EMS American Grilon, Sumter, S.C.), and 1% P152 was added by an Accurate™ dry material feeder (Accurate Inc., Whitewater, Wis.) to a 25 mm corotating Behrstorff twin screw extruder (Behrstorff Charlotte, N.C.) operating at a screw speed of 250 rpm and die temperature of 220 C. The resulting extruded product was a modified polyamide 12 that had at least one pendant phenolic group and pendant primary and secondary amine groups. The extruded strand of modified polyamide 12 was cooled in a water bath and pelletized at a rate of approximately 10 Kg/hr.

The modified polyamide 12 was then coextruded with THV 500 into two layer tubing. The modified polyamide 12 was the cover and the THV 500 was the inner layer. The THV 500 was extruded on a 1 inch diameter Harrell extruder with a temperature profile of 220C, 230, 235, 245, and 250 C barrel temperatures. The inlet flanges were set at 205 and 190 C. The modified polyamide 12 coverstock was extruded on a 2 inch Harrell and a temperature profile 200 C, 200, 200, 200, and 200 C barrel temperatures. The inlet flanges were set at 205 and 195 C. A 2 layer Guill head was used to extrude the tubing. The tooling consisted of a 1 inch ID die and a 0.745 inch OD pin and a 1.760 inch land. The head temperature bands were set at 195 C and the die zone was at 220 C. The overall rate was 67 g/min, and the tubing was vacuumed sized to a final dimension of approximately 6 mm×8 mm.

The adhesion between the two layers was observed to be excellent in that the modified polyamide layer and THV 500 layer of the coextruded tube could not be physically separated.

What is claimed is:

1. A composite comprising:
   (a) a first layer of a substantially non-fluorinated thermoplastic polymer having at least one pendant phenolic group, and a base, and
   (b) a second layer of a fluoropolymer adhered to the first layer, provided that when the pendant phenolic group of the substantially non-fluorinated thermoplastic polymer is derived from the reaction of a functionalized olefin with a bisphenol, substantially no organo-onium is present.

2. The composite of claim 1 wherein the fluoropolymer comprises interpolymerized units selected from the group consisting of vinylidene fluoride and fluorinated monomers which, when polymerized, form a polymer microstructure sequence similar to polymerized vinylidene fluoride in that the polymer has a carbon-bonded hydrogen atom between carbon-bonded fluorine atoms.

3. The composite of claim 2 wherein the vinylidene-fluoride containing fluoropolymer is comprised of interpolymerized units derived from (i) at least one fluorine-containing monomer selected from the group of vinylidene fluoride, trifluoroethylene, 1-hydropentafluoropropylene, 2-hydropentafluoropropylene, and, optionally, (ii) at least one monomer copolymerizable therewith.

4. The composite of claim 3 wherein the monomer (ii) is selected from the group consisting of a fluorine-containing monomer; a fluorine-free, unsaturated olefin monomer; an iodine- or a bromine-containing unsaturated olefin monomer; and a combination thereof.

5. The composite article of claim 4 wherein
   (a) the fluorine-containing monomer is selected from the group consisting of hexafluoropropylene, tetrafluoroethylene, chlorotrifluoroethylene, a fluorinated vinyl ether, and a fluorine-containing di-olefin;
   (b) the fluorine-free, unsaturated olefin monomer is selected from the group consisting of ethylene, propylene, and butadiene; and
   (c) the iodide- or bromide-containing unsaturated olefin monomer is selected from the group consisting of bromodifluoroethylene, bromotrifluoroethylene, iodotrifluoroethylene, and 4-bromo-3,3,4,4-tetrafluoro-1-butene.

6. The composite of claim 1 wherein the fluoropolymer is a terpolymer of ethylene, hexafluoropropylene and tetrafluoroethylene, and having an ethylene content of at least 11% and a hexafluoropropylene content of at least 22%.

7. The composite of claim 1 wherein the fluoropolymer is a terpolymer of ethylene, hexafluoropropylene and tetrafluoroethylene, and having a melting point of less than 168° C.

8. The composite of claim 1 wherein the fluoropolymer is a blend of (i) a fluoropolymer which contains vinylidene fluoride containing polymer and (ii) a non-vinylidene fluoride containing fluoropolymer.

9. The composite of claim 1 wherein the fluoropolymer is a fluoroplastic.

10. The composite of claim 1 wherein the fluoropolymer is a fluoroelastomer.

11. The composite of claim 1 wherein the fluoropolymer is pre-dehydrofluorinated.

12. The composite of claim 1 wherein the fluoropolymer is surface treated.

13. The composite of claim 1 wherein the substantially non-fluorinated thermoplastic (a) is selected from the group consisting of polyanides, polyimides, polyolefins, polystyrenes, polyurethanes, polyesters, polyacrylates, polymethacrylates, polyketones, polyureas and polycarbonates.

14. The composite of claim 13 wherein the substantially non-fluorinated thermoplastic is a polyamide.

15. The composite of claim 14 wherein the polyamide is nylon-12.

16. The composite of claim 14 wherein the polyamide is a zinc chloride resistant polyamide.

17. The composite of claim 16 wherein the base further comprises an organo-onium compound.

18. The composite of claim 16 wherein the base is 1,8diazabicyclo [5,4,0]undec-7-ene.

19. The composite of claim 1 wherein the base is selected from the group consisting of amine compounds, hydroxide compounds and alkoxide compounds, and combinations thereof.

20. The composite article of claim 1 further comprising
(c) a second substantially non-fluorinated polymer component adhered to the first layer.

21. The composite article of claim 20 wherein the component (c) is selected from a polyamide, a polyimide, a polyurethane, a polyolefin, a polystyrene, a polyester, a polycarbonate, a polyketone, a polyurea, a polyacrylate, and a polymethacrylate.

22. The composite article of claim 21 wherein component (c) is a polyamide.

23. The composite article of claim 22 wherein the polyamide is nylon-12.

24. The composite article of claim 22 wherein the polyamide is a zinc chloride resistant polyamide.

25. The composite article of claim 20 wherein the component (c) is an elastomer.

26. The composite article of claim 1 which is shaped.

27. The composite article of claim 26 selected from the group of a wire coating, a tube, a container, a sheet, a cable jacket and a film.

28. The composite article of claim 1 wherein the substantially non-fluorinated thermoplastic polymer further has at least one pendant primary or secondary amine group.

29. The composite article of claim 28 wherein the substantially non-fluorinated thermoplastic polymer is a polyamide.

30. The composite article of claim 29 wherein the polyamide is nylon-12.

31. The composite article of claim 29 wherein the polyamide is a zinc chloride resistant polyamide.

32. The composite of claim 1 further comprising additives in at least one of the components.

33. The composite of claim 1 wherein the pendant phenolic group is a substituted or an unsubstituted phenolic group.

34. The composite of claim 33 wherein the pendant phenolic group is an unsubstituted phenolic group.

35. The composite of claim 33 wherein the pendant phenolic group is a substituted phenolic group.

36. The composite of claim 33 wherein the substantially non-fluorinated thermoplastic polymer has pendant substituted and unsubstituted phenolic groups.

37. A multi-layer polymer article comprising, in order:
a first layer of a fluoropolymer;
a second layer comprising a substantially non-fluorinated thermoplastic having
(i) one or more pendant phenolic groups, and
(ii) a base;
a third layer comprising a substantially non-fluorinated polymer, provided that when the substantially non-fluorinated thermoplastic polymer of the second layer comprises a polyolefin derived from the reaction of a functionalized polyolefin and a base, substantially no organo-onium is used.

38. A shaped composite article of claim 37.

39. The shaped article of claim 38 selected from a sheet, a hose, a tube, a sheet, a film, a wire coating, a cable jacket, and a container.

40. The multilayer article of claim 37 wherein the substantially non-fluorinated thermoplastic polymer of the second layer further has at least one pendant primary or secondary amine groups.

41. The multilayer article of claim 40 wherein the substantially non-fluorinated thermoplastic polymer of the second layer is a polyamide.

42. The multi-layer article of claim 41 wherein the polyamide is nylon-12.

43. The multi-layer article of claim 41 wherein the polyamide is a zinc chloride resistant polyamide.

44. A method of adhering a substantially non-fluorinated polymer to a fluoropolymer comprising
(a) providing (i) a substantially non-fluorinated thermoplastic polymer having at least one pendant phenolic group thereon, (ii) an organic or inorganic base, and (iii) a fluoropolymer,
(b) at least partially reacting the phenolic group with the base to form a modified substantially non-fluorinated thermoplastic polymer,
(c) forming a composite article comprising the fluoropolymer in contact with the modified thermoplastic polymer, and
(d) subjecting the composite article to pressure, and/or temperature conditions adequate to bond the fluoropolymer to the modified thermoplastic polymer,
provided that when the substantially non-fluorinated thermoplastic polymer comprises a polyolefin derived from the reaction of a functionalized polyolefin and a base, substantially no organo-onium is used.

45. The method of claim 44 wherein the substantially non-fluorinated thermoplastic polymer has at least one pendant primary or secondary amine group.

46. The method of claim 45 wherein the substantially non-fluorinated thermoplastic polymer is a polyamide.

47. The method of claim 46 wherein the polyamide is nylon-12.

48. The method of claim 47 wherein the polyamide is a zinc chloride resistant polyamide.

* * * * *

UNITED STATES PATENT AND TRADEMARK OFFICE
CERTIFICATE OF CORRECTION

PATENT NO.   : 6,346,328 B1
DATED        : February 12, 2002
INVENTOR(S)  : Edward E. Parsonage, Attila Molnar, Thomas J. Blong and Robert E. Kolb It is certified that error appears in the above-identified patent and that said Letters Patent is hereby corrected as shown below:

Column 1,
Line 66, delete "WO 93/14933" and insert in place thereof -- WO 93/01493 --.

Column 9,
Line 24, delete "(2-metboxy)" and insert in place thereof -- (2-methoxy) --.

Column 11,
Line 5, delete "100 min/min" and insert in place thereof -- 100 mm/min --.

Column 13,
Line 23, delete "polyanides" and insert in place thereof -- polyamides --.

Signed and Sealed this

Seventeenth Day of December, 2002

JAMES E. ROGAN
*Director of the United States Patent and Trademark Office*